US010823061B2

(12) United States Patent
Wotzak

(10) Patent No.: US 10,823,061 B2
(45) Date of Patent: Nov. 3, 2020

(54) ENGINE AIR INLET HAVING A DOUBLE-PANEL HEATED WALL

(71) Applicant: General Electric Company, Schenectady, NY (US)

(72) Inventor: Mark Gregory Wotzak, Chestnut Hill, MA (US)

(73) Assignee: General Electric Company, Schenectady, NY (US)

( * ) Notice: Subject to any disclaimer, the term of this patent is extended or adjusted under 35 U.S.C. 154(b) by 375 days.

(21) Appl. No.: 15/211,474

(22) Filed: Jul. 15, 2016

(65) Prior Publication Data

US 2018/0016982 A1 Jan. 18, 2018

(51) Int. Cl.
| *F02C 7/047* | (2006.01) |
| *F02C 7/24* | (2006.01) |
| *F02C 7/04* | (2006.01) |
| *F01D 25/26* | (2006.01) |
| *F04D 29/52* | (2006.01) |
| *F04D 29/58* | (2006.01) |
| *B64D 27/12* | (2006.01) |
| *B64D 33/02* | (2006.01) |
| *F01D 25/10* | (2006.01) |
| *F01D 25/14* | (2006.01) |
| *F02C 3/04* | (2006.01) |

(52) U.S. Cl.
CPC .............. *F02C 7/047* (2013.01); *B64D 27/12* (2013.01); *B64D 33/02* (2013.01); *F01D 25/10* (2013.01); *F01D 25/145* (2013.01); *F01D 25/26* (2013.01); *F02C 3/04* (2013.01); *F02C 7/04* (2013.01); *F02C 7/24* (2013.01); *F04D 29/522* (2013.01); *F04D 29/584* (2013.01); *B64D 2033/0233* (2013.01); *F05D 2220/32* (2013.01); *F05D 2220/325* (2013.01); *F05D 2250/51* (2013.01); *F05D 2260/20* (2013.01)

(58) Field of Classification Search
CPC ... F02C 7/047; F02C 7/04; F02C 7/24; B64D 33/02; B64D 15/00; B64D 15/02; B64D 15/04; B64D 15/12; B64D 15/16; F01D 25/10; F01D 25/145; F01D 25/26
See application file for complete search history.

(56) References Cited

U.S. PATENT DOCUMENTS

| 4,542,623 A | 9/1985 | Hovan et al. |
| 6,623,238 B2 | 9/2003 | Langston et al. |
| 7,967,560 B2 | 6/2011 | DiBenedetto |

(Continued)

FOREIGN PATENT DOCUMENTS

| EP | 1013895 A2 | 6/2000 |
| EP | 1013895 A3 | 6/2002 |

OTHER PUBLICATIONS

International Search Report Corresponding to Application No. PCT/US2017/041651 dated Oct. 17, 2017.

*Primary Examiner* — Craig Kim
(74) *Attorney, Agent, or Firm* — Dority & Manning, P.A.

(57) ABSTRACT

An annular air inlet duct circumscribing an axis of rotation of a rotatable member of a machine comprising a forward end and an aft end is described. The air inlet duct includes an unheated wall and a heated wall adjacent to a heat source. The heated wall includes a plurality of axially-spaced wall panels forming a cavity between each of a pair of adjacent wall panels of the plurality of axially-spaced wall panels.

16 Claims, 3 Drawing Sheets

(56) References Cited

U.S. PATENT DOCUMENTS

| | | |
|---|---|---|
| 9,121,491 B2 | 9/2015 | Hancox |
| 2002/0047070 A1 | 4/2002 | Breer et al. |
| 2009/0165995 A1 | 7/2009 | Bajusz et al. |
| 2010/0307161 A1* | 12/2010 | Thomson .............. F23D 11/107 60/748 |
| 2011/0131945 A1* | 6/2011 | Vauchel ................. B64D 15/04 60/39.093 |
| 2012/0251373 A1 | 10/2012 | Bajusz et al. |
| 2013/0283757 A1 | 10/2013 | Bordne et al. |
| 2014/0369812 A1* | 12/2014 | Caruel ...................... F02K 3/06 415/116 |
| 2015/0086352 A1* | 3/2015 | Eleftheriou ............... F02C 7/04 415/213.1 |
| 2015/0139798 A1* | 5/2015 | Duke ...................... G01P 3/488 416/1 |
| 2015/0291284 A1* | 10/2015 | Victor ................... B64D 15/04 244/134 B |
| 2015/0330249 A1 | 11/2015 | Budnick |
| 2016/0032763 A1 | 2/2016 | Grogg et al. |
| 2016/0039528 A1* | 2/2016 | Caruel ...................... F02K 1/64 415/119 |
| 2016/0131036 A1* | 5/2016 | Bintz ....................... F02C 7/16 60/779 |
| 2017/0081020 A1* | 3/2017 | Pujar ...................... B64C 21/06 |

\* cited by examiner

ENGINE AIR INLET HAVING A DOUBLE-PANEL HEATED WALL

BACKGROUND

The field of the disclosure relates generally to gas turbine engines and, more particularly, to gas turbine engines having an air inlet having a double-panel heated wall, heated by an adjacent heat source, for reducing a temperature of the engine air inlet.

In at least some known gas turbine engines, various engine components, such as an oil tank and/or an accessory gearbox, are located adjacent to an engine air inlet. The engine components may generate a great deal of heat. As these hot engine components are only separated from the air inlet by one heated wall of the air inlet heated, this "heated" wall tends to accumulate heat from the engine components (e.g., convective heat from an oil tank).

As the air inlet is heated, air that flows into the engine through the air inlet is likewise heated. The hotter the air that passes through the inlet, the hotter the subsequent air flow throughout the engine, which can reduce efficiency of the engine. Moreover, as the heated wall of the air inlet may get considerably warmer than an opposing, "unheated" wall (i.e., unheated by the same hot engine components), a temperature gradient across the air inlet may occur. Local areas of high heat may experience structural distortion (e.g., twisting or bending), which may negatively affect bearings adjacent to the air inlet as well as seal clearances therearound.

BRIEF DESCRIPTION

In one aspect, an annular air inlet duct circumscribing an axis of rotation of a rotatable member of a machine comprising a forward end and an aft end is provided. The air inlet duct includes an unheated wall and a heated wall adjacent to a heat source. The heated wall includes a plurality of axially-spaced wall panels forming a cavity between each of a pair of adjacent wall panels of the plurality of axially-spaced wall panels.

In another aspect, an engine is provided. The engine includes a core engine positioned aft of a power turbine, a propeller powered by the power turbine using combusting gases generated in the core engine, and an annular air inlet duct formed of a sintered metal material circumscribing an axis of rotation of the engine. The core engine includes a compressor having an inlet duct configured to receive a radially inward flow of air. The air inlet duct includes an unheated wall and a heated wall formed integrally with the unheated wall and positioned adjacent to a heat source. The heated wall includes a plurality of axially-spaced wall panels forming a cavity between each of a pair of adjacent wall panels of the plurality of axially-spaced wall panels.

In yet another aspect, a method of cooling an air flow through a radial inlet duct is provided. The method includes forming an arcuate forming an arcuate unheated inlet duct wall, and positioning an arcuate heated inlet duct wall axially spaced from the unheated inlet duct wall and adjacent to a heat source. The heated inlet duct wall includes a plurality of axially-spaced wall panels. The method also includes forming at least one cavity between each of a pair of adjacent wall panels of the plurality of axially-spaced wall panels. Each cavity is configured to reduce a flow of thermal energy through the heated inlet duct wall.

DRAWINGS

These and other features, aspects, and advantages of the present disclosure will become better understood when the following detailed description is read with reference to the accompanying drawings in which like characters represent like parts throughout the drawings, wherein.

Figure 1:
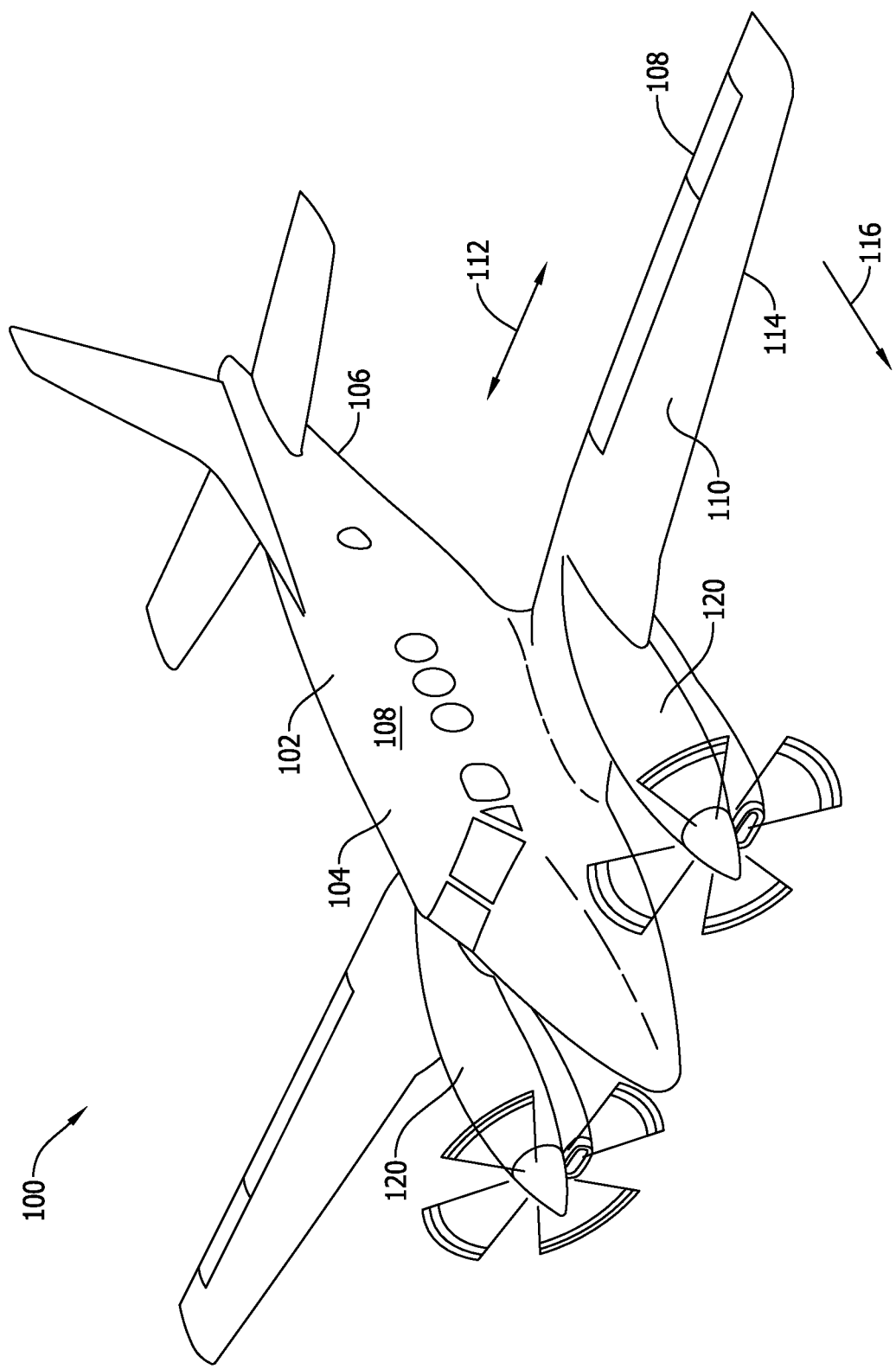
FIG. 1 is a perspective view of an aircraft including an engine in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline of an engine. Moreover, the terms "radial" and "radially" refer to directions and orientations that extend substantially perpendicular to the centerline of the engine. In addition, as used herein, the terms "circumferential" and "circumferentially" refer to directions and orientations that extend arcuately about the centerline of the engine. Furthermore, as used herein, "heated" wall refers to a wall heated by a heat source, such as engine components, adjacent the heated wall, and "unheated" wall refers to a wall that is not heated by that same heat source that heats the heated wall.

Embodiments of the air inlet having a double-panel heated wall described herein provide a solution to the above-described problems. More particularly, the double-panel heated wall includes a heat source-adjacent panel and an inlet-adjacent panel spaced apart by a cavity. This cavity facilitates reducing a temperature of an inlet-adjacent panel. Reducing the temperature of the inlet-adjacent panel facilitates eliminating inlet distortion issues. Moreover, by reducing the temperature of the inlet-adjacent panel, the temperature of the air that flows through the air inlet is likewise reduced. An overall temperature reduction of the air flowing throughout the engine may thereby be effected, which facilitates improving performance of the engine. Accordingly, smaller core engines may be designed that take advantage of this cooler airflow, providing a decrease in specific fuel consumption by that smaller core engine (compared to larger core engines). In addition, the cavity between the two panels may provide a new air inlet anti-ice source, as heated fluid (e.g., hot air or oil) may be channeled through the cavity.

Referring now to the drawings, in which like numerals refer to the same elements throughout the several views, FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120 configured to drive a bladed rotatable member 122 or fan to generate thrust. Engine 120 is coupled to at least one of wing 110 and fuselage 102, for example, in a pusher configuration (not shown) proximate tail 106. Although shown as a turboprop engine in FIG. 1, engine 120 may be embodied in a military purpose engine, a turbofan engine, a turboshaft engine, and/or any other type of engine.

Figure 2:
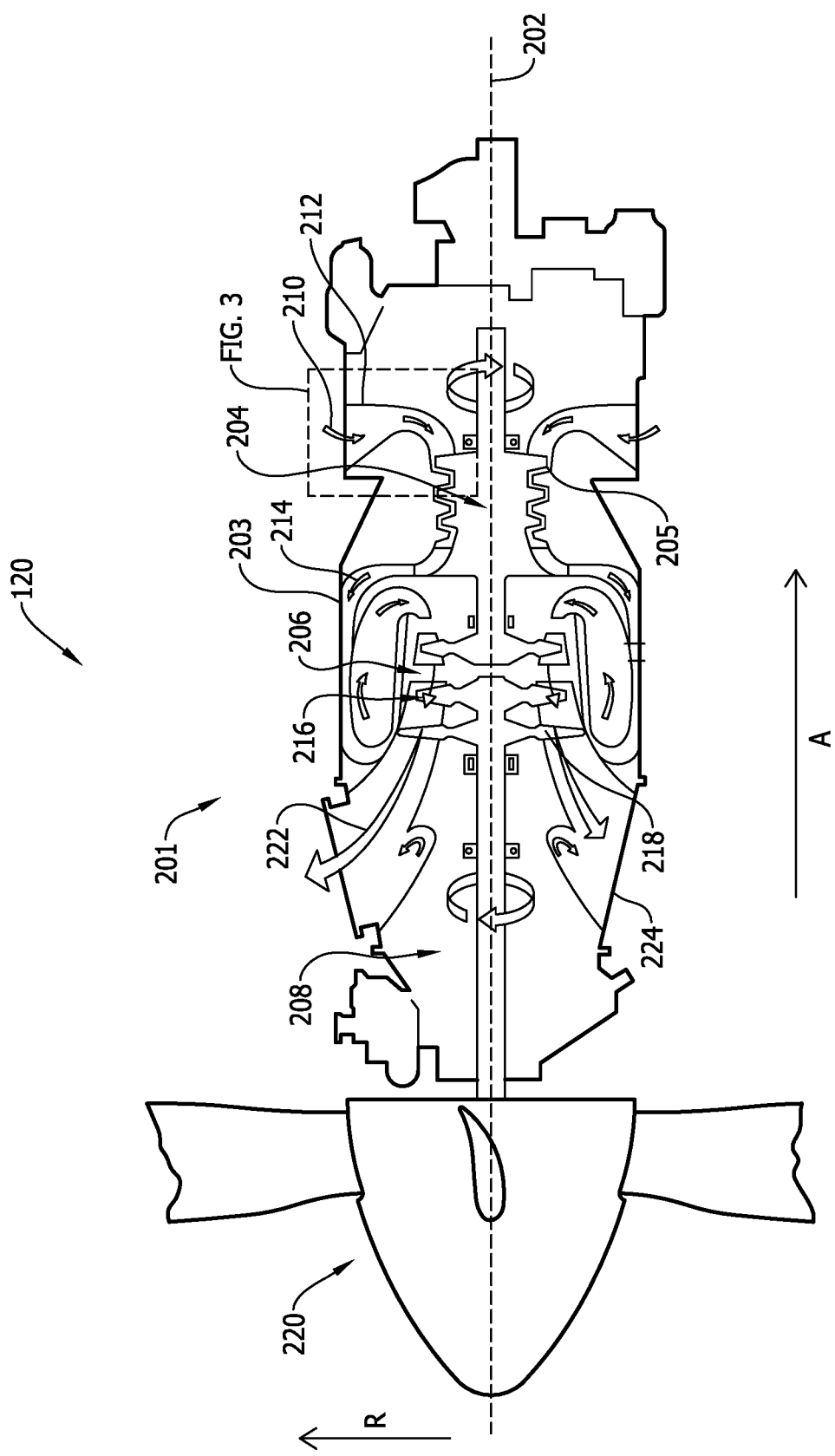
FIG. 2 is a schematic illustration of an exemplary engine as shown in FIG. 1.

FIG. 2 is a schematic cross-sectional view of engine 120 embodied as a turboprop engine in accordance with one exemplary embodiment of the present disclosure. In the example embodiment, engine 120 is a reverse flow gas turboprop engine. While the example embodiment illustrates a reverse flow gas turboprop engine, the present disclosure is not limited to such an engine, and one of ordinary skill in the art will appreciate that the current disclosure may be used in connection with other turbine engines, such as, but not limited to, conventional flow turbine engines. As shown in FIG. 2, engine 120 defines an axial direction A (extending parallel to a longitudinal axis of rotation 202 provided for reference) and a radial direction R.

In the example embodiment, engine 120 includes a core engine 201. Core engine 201 includes an outer casing 203 encasing a (high-pressure) compressor 204, a combustor section 206, and a turbine section 208. An incoming flow of air 210 flows through an annular air inlet 212 and into an inlet duct 205 of compressor 204. Air 210 is compressed by compressor 204. Compressor 204 delivers a compressed flow of air 214 to combustor section 206, where compressed air 214 is mixed with a pressurized flow of fuel. The mixture is ignited to create a flow of hot combustion gases 216. The flow of the hot combustion gases 216 is in turn channeled to turbine section 208. The flow of hot combustion gases 216 drives one or more turbines 218 in turbine section 208 so as to produce mechanical work. In the exemplary embodiment, mechanical work produced by turbine 218 drives compressor 204 via a shaft, as well as an external load, such as a propeller 220 or electrical generator. Exhaust gas 222 is exhausted through one or more radial ducts 224. Engine 120 uses at least one of natural gas, various types of syngas, and/or another suitable fuel.

Figure 3:
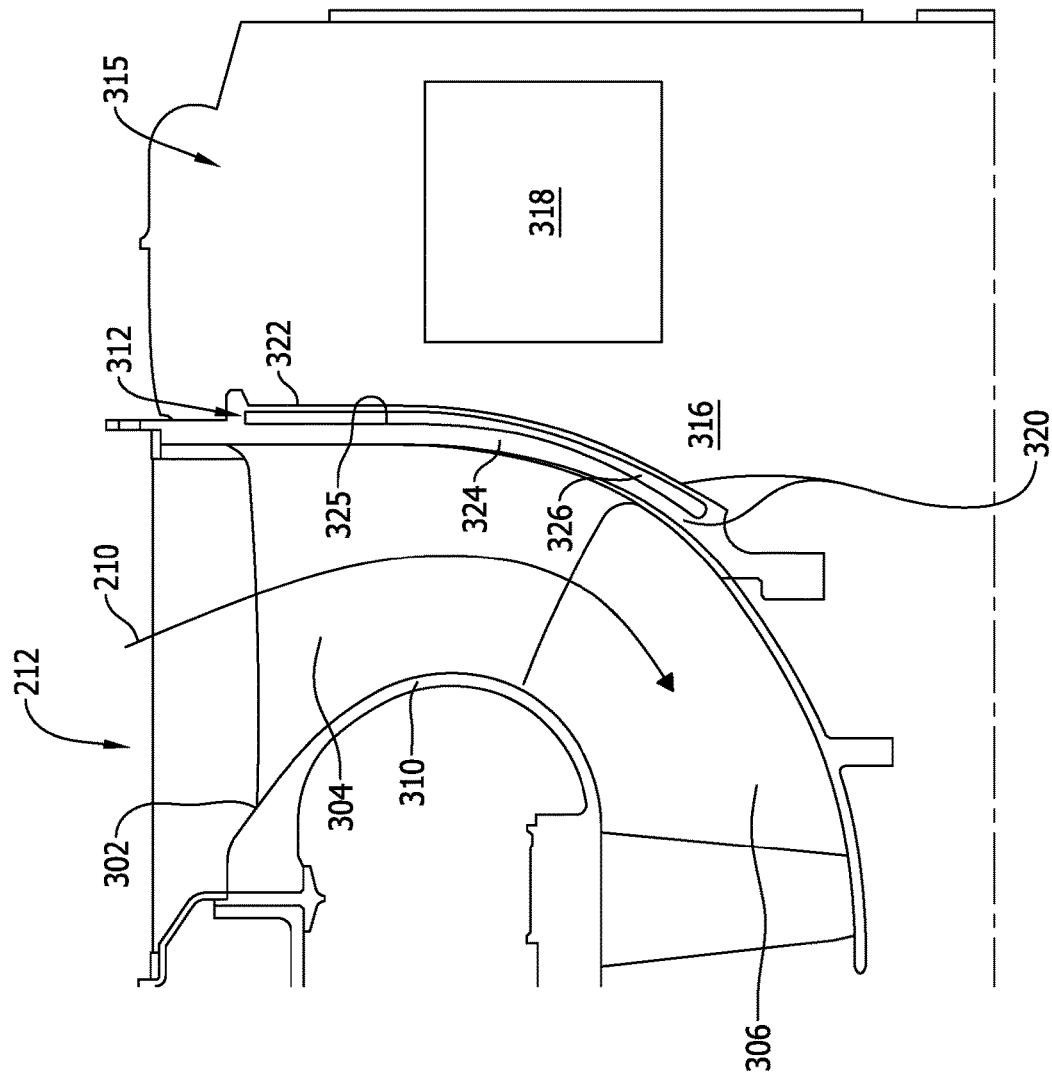
FIG. 3 is a schematic illustration of a double-panel air inlet of the turboprop engine shown in FIG. 2.

FIG. 3 is a schematic cross-sectional view of air inlet 212. Air inlet 212 is generally defined by an annular air inlet duct 302. Inlet duct 302 includes a radially outer inlet mouth 304 and a radially inner converging throat 306. Mouth 304 is configured to receive incoming flow of air 210, which is directed generally radially inwardly. Throat 306 is configured to turn the flow of air 210 in an axially forward direction, towards compressor 204 (shown in FIG. 2). Moreover, inlet duct 302 includes a "heated" wall 312, which is heated by a source of heat, generally indicated by 315, adjacent to heated wall 312. Inlet duct 302 further includes an opposing "unheated" wall, which is positioned opposite heated wall 312, and therefore is further from and substantially unheated by heat source 315. Unheated wall 310 generally defines a forward boundary of inlet duct 302, and heated wall 312 generally defines a rear or aft boundary of inlet duct 302. Each of unheated wall 310 and heated wall 312 is generally arcuate in shape. In the example embodiment, the heat source 315 includes various engine components, including, but not limited to, an oil tank 316, an accessory gear box 318, a fuel pump (not shown), an oil pump (not shown), and/or an electrical generator (not shown).

In the illustrated embodiment, heated wall 312 is a double-panel heated wall 312. Specifically, heated wall 312 includes a plurality of axially spaced wall panels 320. Each pair of axially spaced wall panels 320 of the plurality of wall panels 320 includes a heat source-adjacent panel 322 and an inlet-adjacent panel 324. Each pair of these axially spaced panels 322, 324 forms a cavity 326 therebetween. In some embodiments, cavity 326 includes an evacuated space and/or a purged space. In other embodiments, cavity 326 contains an insulative material (not shown) therein. The insulative material may at least partially fill cavity 326. In the example embodiment, cavity 326 is configured to limit a transfer of heat (e.g., convective heat from oil in oil tank 316) therethrough. Accordingly, a temperature of inlet-adjacent panel 324 is reduced, compared to a temperature of a single-panel heated wall. In particular, in one exemplary embodiment, double-panel heated wall 312 facilitates an inlet temperature reduction of several degrees Fahrenheit. In addition, a temperature of the flow of air 210 through inlet duct 302 is reduced. The temperature of the rest of the air flow throughout engine 120 (shown in FIGS. 1 and 2) may likewise be reduced, which may permit the design of smaller core engines 201 (shown in FIG. 2). Smaller core engines 201 may consume less fuel than, for example, comparatively larger core engines. Moreover, a temperature gradient across inlet duct 302 (e.g., between heated wall 312 and unheated wall 310) may be reduced. In a single-panel heated wall embodiment, local areas of high heat at the heated wall and/or a temperature gradient across the inlet duct may cause structural distortion of the heated wall. In the illustrated embodiment of core engine 201, such distortion may affect seal clearance and/or bearing clearances about inlet 212. Double-panel heated wall 312, as shown, facilitates reducing the temperature gradient and preventing localized areas of high heat, thereby preventing and/or reducing structural distortion of the shape of inlet duct 302. Preventing and/or reducing structural distortion facilitates ensuring the seal and/or bearing clearances about inlet 212 are maintained.

In some embodiments, cavity 326 contains an anti-ice heated fluid (e.g., heated air or oil, not shown) therein. In these embodiments, the anti-ice heated fluid may only be channeled to cavity 326 during certain phases of a flight, such as start-up, to provide an anti-ice source to inlet duct 302. Accordingly, upon starting engine 120 in a cold environment, channeling an anti-ice heated fluid through cavity 326 facilitates anti-icing of air inlet 212. In some embodiments, heat source-adjacent panel 322 includes a valve and/or inlet (not shown) configured to permit a flow of anti-ice heated fluid into cavity 326 during such flight phases. Heat source-adjacent panel 322 may additionally include a valve and/or outlet (not shown) configured to permit outflow of anti-ice heated fluid from cavity 326 after completion of such flight phases.

In the example embodiment, double-panel heated wall 312 is fabricated using an additive manufacturing process. As used herein, "additive manufacturing" refers to any process which results in a three-dimensional object and includes a step of sequentially forming the shape of the object one layer at a time. Additive manufacturing processes include, for example, three dimensional printing, laser-net-shape manufacturing, direct metal laser sintering (DMLS), direct metal laser melting (DMLM), selective laser sintering (SLS), plasma transferred arc, freeform fabrication, and the like. One exemplary type of additive manufacturing process uses a laser beam to sinter or melt a powder material. Additive manufacturing processes can employ powder materials or wire as a raw material. Moreover, additive manufacturing processes can generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially sintered (fused) or melted to solidify the layer. For example, in some embodiments, heat source-adjacent panel 322 is fabricated by at least one of molding, cutting, and/or 3-D printing. Fabricating heat-source adjacent panel 322 using an additive manufacturing process allows heat-source adjacent panel 322 to be specifically designed to fit any kind of complex geometry of inlet 212. Each heat source-adjacent panel 322 is coupled to a first face 325 of inlet-adjacent panel(s) 324 with cavity 326 between inlet-adjacent panel(s) 324 and heat source-adjacent panel(s) 322. It should be understood that other methods of providing or fabricating double-panel heated wall 312 may be implemented, such as integrally forming heat source-adjacent panel 322 with the inlet-adjacent panel 324 when inlet duct 302 is fabricated. Moreover, unheated wall 310 may be integrally formed with heated wall 312, and accordingly may be fabricated using any of the above-described processes.

The above-described annular air inlet duct provides an efficient method for insulating an air flow through an inlet duct from a heat source within an engine. Specifically, the above-described inlet duct includes a double-panel heated wall with a cavity therein. The cavity is configured to reduce a transfer of heat through the heated wall, such that the temperature of the air inlet duct, and the air flow therethrough, may be reduced. Accordingly, a core engine size reduction may be realized. Moreover, the above-described inlet duct minimizes a temperature gradient between the heated wall and an opposing unheated wall thereof, and substantially eliminates localized areas of high heat along the heated wall. Accordingly, structural distortion caused by either of both of a high temperature gradient and localized high heat may be reduced and/or eliminated. The cavity further provides a new anti-ice source for a radial air inlet duct, as an anti-ice heated fluid may be channeled therethrough during start-up, particularly in a cold ambient environment.

Exemplary embodiments of an air inlet duct having a double-panel heated wall are described above in detail. The inlet ducts, and methods of fabricating and using the same, are not limited to the specific embodiments described herein, but rather, components of the inlet duct and/or steps of the method may be utilized independently and separately from other components and/or steps described herein. For example, the double-panel heated wall designed may be used in combination with other systems requiring a reduction of heat transfer between components or spaces, and are not limited to practice with only the systems and methods as described herein. Rather, the exemplary embodiment can be implemented and utilized in connection with many other engine and/or non-engine applications that are currently configured to reduce heat transfer between adjacent components.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An annular air inlet duct assembly comprising:
an annular air inlet duct circumscribing an axis of rotation of a rotatable member of a machine comprising a forward end and an aft end; and
an oil tank having an accessory gear box therein,
wherein said air inlet duct comprises:
an unheated wall; and
a heated wall having a first surface within the oil tank and a second surface facing the unheated wall,
wherein said heated wall comprises a pair of adjacent wall panels that are axially spaced forming a cavity therebetween,
wherein the cavity includes an evacuated space between the pair of adjacent wall panels, and
wherein the pair of adjacent wall panels are positioned adjacent to the accessory gear box.

2. The annular air inlet duct assembly of claim 1, wherein said cavity further includes at least one of a purged space, and a space containing an insulative material.

3. The annular air inlet duct assembly of claim 1, wherein said unheated wall and said heated wall form a radial outer inlet mouth and a radial inner converging throat.

4. The annular air inlet duct assembly of claim 3, wherein said radial outer inlet mouth is configured to receive a radial inward flow of air, and wherein said radial inner converging throat is configured to turn the radial inward flow of air in an axially forward direction.

5. The annular air inlet duct assembly of claim 1, wherein said annular air inlet duct is formed of a sintered metal material.

6. The annular air inlet duct assembly of claim 1, wherein the heat source includes gas turbine engine components.

7. An engine comprising:
a core engine positioned aft of a power turbine, said core engine comprising a compressor having an inlet duct configured to receive a radial inward flow of air;
a propeller powered by the power turbine using combusting gases generated in said core engine;

an annular air inlet duct formed of a sintered metal material circumscribing an axis of rotation of said engine; and an oil tank having an accessory gear box therein, wherein said air inlet duct comprises:
   an unheated wall; and
   a heated wall formed integrally with said unheated wall and having a first surface within the oil tank and a second surface facing the unheated wall,
   wherein said heated wall comprises a pair of adjacent wall panels that are axially spaced forming a cavity therebetween,
   wherein the cavity includes an evacuated space between the pair of adjacent wall panels, and
   wherein the pair of adjacent wall panels are positioned adjacent to the accessory gear box.

8. The engine of claim 7, wherein said cavity further includes at least one of a purged space or a space containing an insulative material.

9. The engine of claim 7, wherein said cavity is configured to contain an anti-ice heated fluid.

10. The engine of claim 7, wherein said unheated wall and said heated wall form a radial outer inlet mouth and a radial inner converging throat.

11. The engine of claim 10, wherein said radial outer inlet mouth is configured to receive the radial inward flow of air, and wherein said radial inner converging throat is configured to turn the radial inward flow of air in an axially forward direction towards said compressor.

12. A method for assembling an inlet duct, said method comprising:
   forming an arcuate unheated inlet duct wall;
   positioning an arcuate heated inlet duct wall axially spaced from the unheated inlet duct wall such that a first surface of the heated inlet duct wall is positioned within an oil tank and a second surface of the heated inlet duct wall faces the unheated inlet duct wall, wherein the heated inlet duct wall comprises a pair of adjacent wall panels that are axially spaced;
   forming a cavity between the pair of adjacent wall panels, wherein the cavity is configured to reduce a flow of thermal energy through the heated inlet duct wall; and
   evacuating the cavity between the pair of adjacent wall panels,
   wherein the pair of adjacent wall panels are positioned adjacent to an accessory gear box in the oil tank.

13. The method of claim 12, further comprising at least one of purging the cavity or at least partially filling the cavity with an insulative material.

14. The method of claim 12, further comprising forming at least one of the arcuate unheated inlet duct wall and arcuate heated inlet duct wall from a sintered metal material.

15. The method of claim 12, further comprising reducing a distortion of a shape of the heated inlet duct wall using the pair of adjacent wall panels.

16. The method of claim 12, further comprising channeling an anti-ice heated fluid to the cavity, wherein channeling the anti-ice heated fluid is based on phases of a flight.

* * * * *